Figure 1:
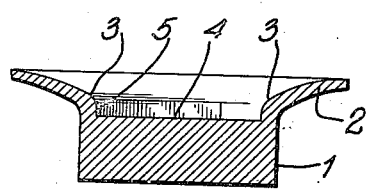

June 13, 1944.　　　　R. W. LUCE　　　　2,351,057

METHOD OF MAKING THREADED LOCKING DEVICES

Filed Feb. 5, 1943

INVENTOR
RICHARD W. LUCE
BY
George T. Gill
ATTORNEY

Patented June 13, 1944

2,351,057

UNITED STATES PATENT OFFICE 2,351,057

METHOD OF MAKING THREADED LOCKING DEVICES

Richard W. Luce, Southport, Conn.

Application February 5, 1943, Serial No. 474,762

6 Claims. (Cl. 10—86)

The invention herein disclosed relates to a method of producing a self-locking nut of the kind in which an elastic washer effects the locking action.

In a lock-nut of the kind mentioned, there is a threaded nut body and commonly a non-metallic, fibrous, elastic, washer secured at one end of the nut body. In general, the nut body and washer retainer are integral, formed from a single piece of metal such as bar stock. The nut retainer consists of an axial extending cylinder that is rolled over on the washer to secure the washer in place and against rotation with respect to the nut body.

An object of this invention is to provide a method for making such lock-nuts that consists of few steps, eliminates machinery operations, and reduces the cost of manufacturing lock-nuts of the kind mentioned. Another object of the invention is to provide a method by which the metal blanks for such lock-nuts may be made by a heading and punching operation.

In accordance with the invention a blank is formed in a heading operation and includes a nut body and an outwardly flaring flange at one end of the nut body. This flange is trimmed to provide a suitable flange for rolling inwardly. The nut body has a hole formed therein, preferably by a punch. It is then tapped. Thereafter, an elastic washer is placed within the flange against the end surface of the nut body. The flange is then rolled inwardly to extend over and engage the washer.

Figure 2:
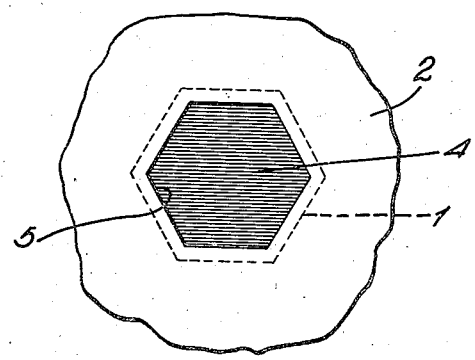
Figure 3:
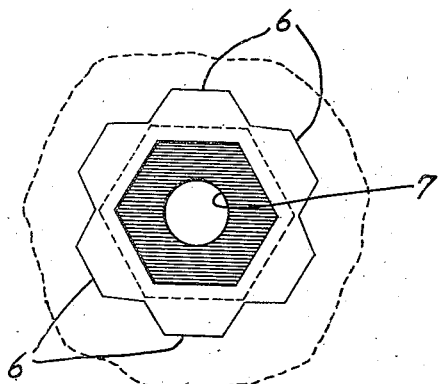
Figure 4:
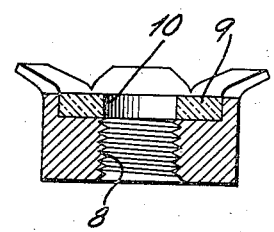
Figure 5:
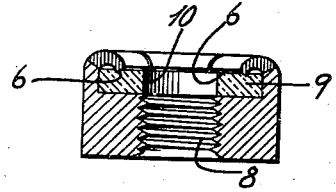

The method is described specifically below as it is performed in the making of a nut. This description is to be read in conjunction with the accompanying drawing wherein the various stages of the forming of the blank to the completed nut are illustrated. The drawing includes:

Fig. 1 which is a sectional elevation of a headed nut blank;

Fig. 2 which is a plan of the same;

Fig. 3 which is a plan of the same showing the manner in which the flange is trimmed;

Fig. 4 which is a sectional elevation of the tapped blank with the washer in place;

Fig. 5 which is a sectional elevation of the completed nut; and

Figure 6:
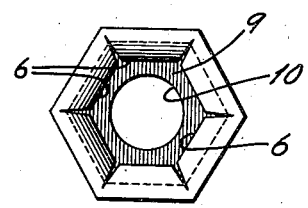

Fig. 6 which is a plan of the same.

In the first instance, a blank such as illustrated in Figs. 1 and 2 is formed in a heading operation. This blank may be headed from wire or from a slug. The bank is formed to include a nut body 1 and an outwardly extending flash or flange 2 which is joined to the end of the nut body in a smooth curve 3. This flange may taper in thickness towards its outer edge. In having the flange join the end of the nut body in a smooth curve, as indicated at 3, the metal is properly related for, as is done later, rolling the flange inwardly.

In the blank illustrated the depression 4 at the end of the nut body 1, formed by the partially axially extending section 5 of the curved portion of the flange is of polygonal configuration, specifically hexagonal. The nut body is, also hexagonal in plan or transverse section.

After the blank of Figs. 1 and 2 is formed in the heading operation, the flange 2 is trimmed. In the trimming of the flange, a series of strips 6, as seen in Fig. 3, are formed, one for each face of the polygonal depression 4. Then the blank is either bored or punched to form an opening 7 through the nut body. The trimming of the flange and punching may be done in the one operation. The nut body is then tapped to form a thread 8 therein.

A non-metallic, fibrous washer 9 having a perimeter complementary to the perimeter of the depression 4 is inserted in the depression against the end face of the nut body. The washer has an opening 10 therethrough of a diameter less than the major and greater than the minor diameter of the thread 8 in the nut body. After the washer is placed in the depression, the flange is rolled back or inwardly to extend axially along the edge of the washer and inwardly to engage the washer and clamp it in position.

The nut so formed is illustrated in Figs. 5 and 6 of the drawing. In this nut, the washer is securely held in place by the inturned flange against axial and rotative movement with respect to the nut body. The hexagonal configuration of the depression 4 and the complementary configuration of the perimeter of the washer also serves to prevent rotation of the washer with respect to the nut body.

It will be obvious that various changes may be made by those skilled in the art in the steps of the method described in detail above within the principle and scope of the invention as expressed in the appended claims.

I claim:

1. The method of producing a self-locking nut of the kind in which an elastic washer effects the locking action, which method includes the steps of heading a blank to include a nut body with a depression at one end and an outwardly flaring flange at the end containing the depression, trimming the flange, forming a hole through the body portion and tapping the body portion, placing an elastic washer in the depression and rolling the flange inwardly to engage the end surface of the washer and retain the washer in position.

2. The method of producing a self-locking nut of the kind in which an elastic washer effects the locking action, which method includes the steps of heading a polygonal shaped blank to produce a nut body with a polygonal depression at one end and an outwardly flaring flange at the end containing the depression, trimming the flange to produce a plurality of outwardly extending strips, forming a hole through and tapping the body portion, placing an elastic washer in the depression and rolling the flange and strips inwardly to extend over and engage the washer.

3. The method of producing a self-locking nut of the kind in which an elastic washer effects the locking action, which method includes the steps of heading a blank to include a nut body with a depression at one end and an outwardly extending flange joined to the nut body in a smooth curve, trimming the flange, forming a hole through and tapping the body, placing an elastic washer in the depression, and rolling the flange inwardly to extend over and engage the washer.

4. The method of producing a self-locking nut of the kind in which an elastic washer effects the locking action, which method includes the steps of heading a blank to include a nut body and an outwardly flaring flange at one end joined to the end of the body in a smooth curve, trimming the flange, forming a hole through and tapping the body, placing an elastic washer within the flange body, and against the end of the body, and rolling the flange inwardly to extend over and engage the washer.

5. The method of producing a self-locking nut of the kind in which an elastic washer effects the locking action, which method includes the steps of heading a blank to include a nut body with a polygonal depression at one end and an outwardly flaring flange joined to the end of the body in a smooth curve, trimming the flange, forming a hole through and tapping the body, placing a polygonal washer in the depression, and rolling the flange upwardly and inwardly to extend over and engage the washer.

6. The method of producing a self-locking nut of the kind in which an elastic washer effects the locking action, which method includes the steps of heading a blank to include a nut body with a polygonal depression at one end and an outwardly flaring flange joined to the end of the body in a smooth curve, trimming the flange to form a plurality of strips corresponding in number to the faces of the polygonal depression, forming a hole through and tapping the body, placing a polygonal washer in the depression, and rolling the flange inwardly to extend over and engage the washer.

RICHARD W. LUCE.